US012293699B2

(12) United States Patent
Li et al.

(10) Patent No.: US 12,293,699 B2
(45) Date of Patent: May 6, 2025

(54) DRIVING SUBSTRATE, AND DISPLAY PANEL

(71) Applicant: HKC CORPORATION LIMITED, Shenzhen (CN)

(72) Inventors: Zeyao Li, Shenzhen (CN); Rongrong Li, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 13 days.

(21) Appl. No.: 18/078,102

(22) Filed: Dec. 9, 2022

(65) Prior Publication Data

US 2023/0386392 A1 Nov. 30, 2023

(30) Foreign Application Priority Data

May 25, 2022 (CN) ......................... 202210576561.0

(51) Int. Cl.

*G09G 3/32* (2016.01)
*G09G 3/20* (2006.01)
*G09G 3/3266* (2016.01)
*G09G 3/3216* (2016.01)
*G09G 3/3225* (2016.01)

(52) U.S. Cl.

CPC ................. *G09G 3/32* (2013.01); *G09G 3/20* (2013.01); *G09G 3/3266* (2013.01);

(Continued)

(58) Field of Classification Search

CPC .......... G09G 3/20; G09G 3/32; G09G 3/3216; G09G 3/3225; G09G 3/3266;

(Continued)

(56) References Cited

U.S. PATENT DOCUMENTS 10,191,344 B2 * 1/2019 Noma ................. G02F 1/13454
2016/0019856 A1 * 1/2016 Tanaka ................. G09G 3/3666 345/206

(Continued)

FOREIGN PATENT DOCUMENTS

CN 104900211 A 9/2015
CN 104934005 A 9/2015

(Continued)

OTHER PUBLICATIONS

Chinese First Office Action,Chinese Application No. 202210576561.0, mailed Jul. 4, 2022 (18 pages).

(Continued)

*Primary Examiner* — Jason M Mandeville

(57) ABSTRACT

Disclosed are a driving substrate and a display panel. The driving substrate is configured to drive a light-emitting unit to emit light and includes a base including a display region, multiple rows of scan lines and multiple data lines arranged on the base, and a scan driving circuit. Multiple pixel regions are defined by the multiple rows of scan lines and the multiple data lines crossing each other longitudinally and horizontally. The pixel regions are located in the display region. Row directions of the multiple pixel regions are substantially parallel to the scan lines. The scan driving circuit is arranged in the display region of the base and includes multiple scan driving units which are cascaded. A same scan driving unit is arranged in pixel regions in at least two rows among the plurality of pixel regions and capable of outputting at least one row of gate scanning signal.

17 Claims, 6 Drawing Sheets

(52) U.S. Cl.
CPC ......... *G09G 3/3216* (2013.01); *G09G 3/3225* (2013.01); *G09G 2300/0408* (2013.01); *G09G 2300/0426* (2013.01); *G09G 2310/02* (2013.01); *G09G 2310/0202* (2013.01); *G09G 2310/0205* (2013.01); *G09G 2310/0218* (2013.01); *G09G 2310/0264* (2013.01); *G09G 2310/0267* (2013.01); *G09G 2310/0286* (2013.01)

(58) Field of Classification Search
CPC ... G09G 2300/0408; G09G 2300/0426; G09G 2310/02; G09G 2310/0202; G09G 2310/0205; G09G 2310/0218; G09G 2310/0264; G09G 2310/0267; G09G 2310/0286
USPC .......................................................... 345/206
See application file for complete search history.

(56) References Cited

U.S. PATENT DOCUMENTS

| | | | | |
|---|---|---|---|---|
| 2017/0255074 | A1* | 9/2017 | Nishiyama | G02F 1/13454 |
| 2019/0147818 | A1* | 5/2019 | Wang | G09G 3/3674 345/204 |
| 2022/0139348 | A1 | 5/2022 | Xue | |

FOREIGN PATENT DOCUMENTS

| | | | |
|---|---|---|---|
| CN | 105139806 | A | 12/2015 |
| CN | 106023944 | A | 10/2016 |
| CN | 207637473 | U | 7/2018 |
| CN | 109410885 | A | 3/2019 |
| CN | 109410886 | A | 3/2019 |
| CN | 110211527 | A | 9/2019 |
| CN | 111179797 | A | 5/2020 |
| CN | 111243543 | A | 6/2020 |
| CN | 111430415 | A | 7/2020 |
| CN | 112669745 | A | 4/2021 |
| CN | 112785962 | A | 5/2021 |
| CN | 110706599 | B | 1/2022 |
| EP | 2902994 | A1 | 8/2015 |

OTHER PUBLICATIONS

Chinese second Office Action,Chinese Application No. 202210576561.0, mailed Jul. 25, 2022 (19 pages).

Notification to Grant Patent Right for Invention, Chinese Application No. 202210576561.0, mailed Aug. 11, 2022 (6 pages).

* cited by examiner

DRIVING SUBSTRATE, AND DISPLAY PANEL

CROSS REFERENCE

The present application claims priority of Chinese Patent Application No. 202210576561.0, filed on May 25, 2022, the entire contents of which are hereby incorporated by reference in its entirety.

TECHNICAL FIELD

The present disclosure relates to the field of display technologies, and in particular to a driving substrate and a display panel.

BACKGROUND

With requirements for displays growing, a current demand for a frameless display is getting higher and higher. A display in the related art includes non-display regions disposed on four sides, i.e., an upper side, a lower side, a left side, and a right side. A non-display region in the left side and a non-display region in the right side are mainly occupied by a gate driver on array (GOA) circuit, such that the upper side and the lower side cannot be frameless.

For this, a conventional method adopted in the related art is to place the GOA circuit of a current row in a pixel display region of the corresponding row. However, when the GOA circuit is placed in a display region, a row spacing between light-emitting units may be increased, thereby reducing a resolution of the display. Further, when other lines in an upper frame and a lower frame are placed in the display region, the outermost display regions of the upper frame and the lower frame may have no space to place the GOA.

SUMMARY OF THE DISCLOSURE

To solve the above technical problem, the present disclosure provides a driving substrate configured to drive a light-emitting unit to emit light and including a base including a display region, a plurality of rows of scan lines and a plurality of data lines arranged on the base, and a scan driving circuit arranged in the display region of the base. A plurality of pixel regions are defined by the plurality rows of scan lines and the plurality of data lines crossing each other longitudinally and horizontally, the plurality of pixel regions are located in the display region, and row directions of the plurality of pixel regions are substantially parallel to the scan lines. The scan driving circuit includes a plurality of scan driving units which are cascaded. A same scan driving unit is arranged in the pixel regions in at least two rows and capable of outputting at least one row of gate scanning signal.

To solve the above technical problem, the present disclosure further provides a display panel, including the driving substrate as described above and a plurality of light-emitting units; each of the plurality of pixel regions is arranged with one of the plurality of light-emitting units.

To solve the above technical problem, the present disclosure further provides a display panel, including a first substrate served as the driving substrate as described above, a second substrate, and a light-emitting unit; the second substrate faces towards the first substrate; the light-emitting unit is disposed between the first substrate and the second substrate; the plurality of rows of scan lines and the plurality of data lines are arranged on a side of the base close to the second substrate.

BRIEF DESCRIPTION OF THE DRAWINGS

In order to more clearly illustrate the technical solutions in the embodiments of the present disclosure, a brief description of the accompanying drawings to be used in the description of the embodiments will be given below. It will be obvious that the accompanying drawings in the following description are only some embodiments of the present disclosure, and that other accompanying drawings may be obtained on the basis of these drawings without any creative effort for those skilled in the art.

REFERENCE NUMERALS DESCRIPTION

Figure 1:
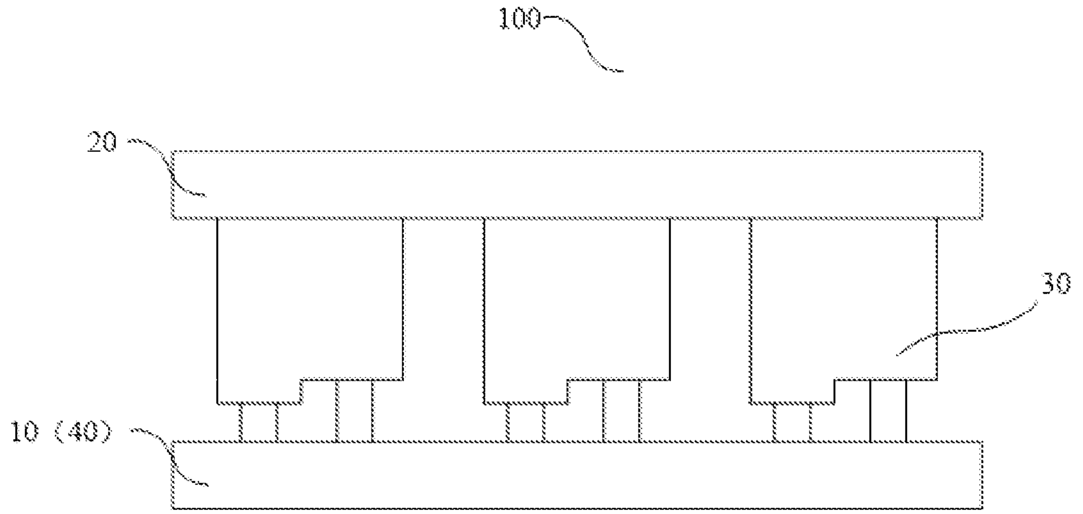
FIG. 1 is a structural schematic view of a display panel according to some embodiments of the present disclosure.

First substrate—1, base—11, display region—111, non-display region—112, scan line—12, data line—13, scan driving circuit—15, scan driving unit—150, charging unit—151, resetting unit—152, outputting unit—152, first thin film transistor—$T_1$, second thin film transistor—$T_2$, first sub thin film transistor—$T_{2-1}$, second sub thin film transistor—$T_{2-2}$, third thin film transistor—$T_3$, fourth thin film transistor—$T_4$, fifth thin film transistor—$T_5$, sixth thin film transistor—$T_6$, seventh thin film transistor—$T_7$, eighth thin film transistor—$T_8$, capacitor—C, clock signal line—CLK, low-level signal line—Vss, other lines—16, pixel region—17, second substrate—20, light-emitting unit—30, driving substrate—40, display panel—100

DETAILED DESCRIPTION

The technical solutions in the embodiments of the present disclosure will be described in detail below in conjunction with accompanying drawings of the present disclosure.

In the following description, specific details such as particular system structures, interfaces, techniques, etc., are presented for the purpose of illustration and not for the purpose of limitation, in order to provide a thorough understanding of the present disclosure.

The technical solutions in the embodiments of the present disclosure will be clearly and completely described below with reference to drawings in the embodiments of the present disclosure. Obviously, the described embodiments are only a part of the embodiments of the present disclosure, but not all of the embodiments. Based on the embodiments in the present disclosure, all other embodiments obtained by those skilled in the art without creative efforts shall fall within the scope of the present disclosure.

The terms "first", "second", and "third" in the present disclosure are intended for descriptive purposes only and are not to be construed as indicating or implying relative importance or implicitly specifying the number of indicated technical features. Therefore, a feature defined with "first", "second", or "third" may explicitly or implicitly include at least one such feature. In the description of the present disclosure, "plurality" means at least two, e.g., two, three, etc., unless otherwise expressly and specifically limited. All directional indications (such as up, down, left, right, forward, backward) in the present disclosure are intended only to explain the relative position relationship, movement, etc. between components in a particular attitude (as shown in the accompanying drawings). If the particular attitude is changed, the directional indications are changed accordingly. In addition, the terms "include" and "have" and any variations thereof are intended to cover non-exclusive inclusion. For example, a process, method, system, product, or apparatus including a series of steps or units is not limited to the listed steps or regions, but optionally further includes steps or regions not listed, or optionally further includes other steps or regions inherent to the process, method, product, or apparatus.

References herein to "embodiments" mean that particular features, structures, or characteristics described in connection with some embodiments may be included in at least one embodiment of the present disclosure. The presence of the phrase at various points in the specification does not necessarily mean the same embodiment, nor is it a separate or alternative embodiment that is mutually exclusive with other embodiments. It is understood, both explicitly and implicitly, by those skilled in the art that the embodiments described herein may be combined with other embodiments.

As shown in FIG. 1, FIG. 1 is a structural schematic view of a display panel according to some embodiments of the present disclosure.

The display panel 100 includes a first substrate 10, a second substrate 20, and a light-emitting unit 30. The first substrate 10 faces towards the second substrate 20. A spacing space is defined between the first substrate 10 and the second substrate 20, the light-emitting unit 30 is disposed in the spacing space, and clamped by or sandwiched between the first substrate 10 and the second substrate 20. The display panel 100 further includes a structure such as an epoxy layer (not shown), an insulating layer (not shown), and an encapsulation layer (not shown), which are the same as or similar to those in the related art and will not be described herein. In some embodiments, the light-emitting unit 30 is a light emitting diode (LED). A size of the LED is less than or equal to 200 μm. The LED may be a micron light emitting diode (Micro-LED) or a mini light emitting diode (Mini-LED). Herein, the Mini LED has a size of 50 to 200 μm and the Micro LED has a size of less than 50 μm. The LED may also be classified as an ordinary monochromatic LED, a high brightness LED, an ultra-high brightness LED, a color-changing LED, a flickering LED, a voltage-controlled LED, an infrared LED, and a negative resistance LED, etc., without restriction herein. The light-emitting unit 30 may be other current-driven light-emitting components.

One of the first substrate 10 and the second substrate 20 is configured as a driving substrate 40 and the other of the first substrate 10 and the second substrate 20 is configured as a package substrate. In some embodiments, the first substrate 10 is configured as the driving substrate 40, and the second substrate 20 is configured as the package substrate. It can be understood that the second substrate 20 may also be omitted, and the light-emitting unit 30 may be directly covered by a transparent encapsulation layer.

Figure 2:
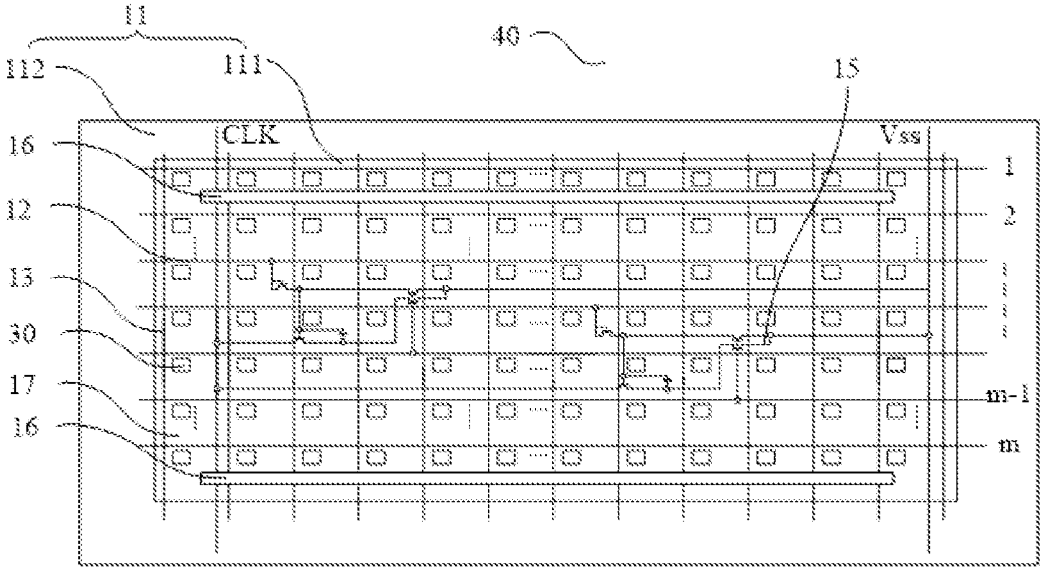
FIG. 2 is a structural schematic view of a driving substrate according to some embodiments of the present disclosure.

As shown in FIGS. 1 and 2, FIG. 2 is a structural schematic view of a driving substrate according to some embodiments of the present disclosure.

The first substrate 10 is served as the driving substrate 40. The driving substrate 40 includes a base 11, multiple scan lines 12, multiple data lines 13, a scan driving circuit 15, a clock signal line CLK, a low-level signal line Vss, and other lines 16 (e.g., a high-level signal line Vdd, a sensing signal line, etc.). The base 11 includes a display region 111 and a non-display region 112. The base 11 is generally made of alkali-free borosilicate glass with excellent mechanical properties and heat and chemical resistance. Multiple scan lines 12 and multiple data lines 13 are arranged on a side of the base 11 close to the second substrate 20. The multiple scan lines 12 are arranged substantially parallel to each other. The multiple data lines 13 are arranged substantially parallel to each other. The multiple scan lines 12 and the multiple data lines 13 cross each other longitudinally and horizontally to define multiple pixel regions 17, and the light-emitting unit 30 is arranged in each pixel region 17. An electrode pad (not shown) is arranged on the driving substrate 40 and configured to be connected to a positive electrode and a negative electrode of the light-emitting unit 30. The scan driving circuit 15 is arranged in the display region 111 of the base 11, connected to the scan lines 12 for outputting a gate scanning signal. The high-level signal line Vdd (not shown) is configured to provide a high-level signal. The low-level signal line Vss is configured to provide a low-level signal. Both the high-level signal line Vdd and the low-level signal line Vss extend along an extending direction of the data line 13, and spaced from the data line 13. The clock signal line CLK is configured to provide a clock signal, and voltages of the low-level signal line Vss and the clock signal line CLK are in opposite phases. The clock signal line CLK extends along the extending direction of the data line 13, and is spaced from the data line 13. The other lines 16 are disposed on two sides of the display region 111 along the extending direction of the data line 13.

The number of the scan lines 12 is m. The scan driving circuit 15 is simply arranged in the pixel regions 17 defined by the scan lines 12 in the $2^{nd}$ row to the $(m-1)^{th}$ row. The scan driving circuit 15 is configured to output gate scanning signals to m rows of the scan lines, and m is an integer greater than or equal to 4. The other lines 16 are arranged in the pixel regions 17 defined by the scan lines 12 in the 1st row to the $m^{th}$ row. In some embodiments, the other lines 16 may be disposed in the pixel regions 17 of multiple rows in the outermost display region 111 of the upper frame and the pixel regions 17 of multiple rows in the outermost display region 111 of the lower frame. In case that the pixel regions 17 in a row are provided with the other lines 16, the pixel regions 17 in that row are not additionally provided with the scan driving circuit 15.

In the embodiments of the present disclosure, the pixel regions 17 have a row direction substantially parallel to the scan lines 12. That is, the pixel regions 17 in each row include multiple pixel regions 17, and are successively arranged along a direction substantially parallel to the scan lines 12. Each pixel region 17 is arranged with at least one light-emitting unit 30. i.e., there may be one light-emitting unit 30 or multiple light-emitting units 30 within each pixel region 17, which will not be limited herein. In the present embodiment, one light-emitting unit 30 being included in one pixel region 17 is taken as an example for illustration.

Figure 3:
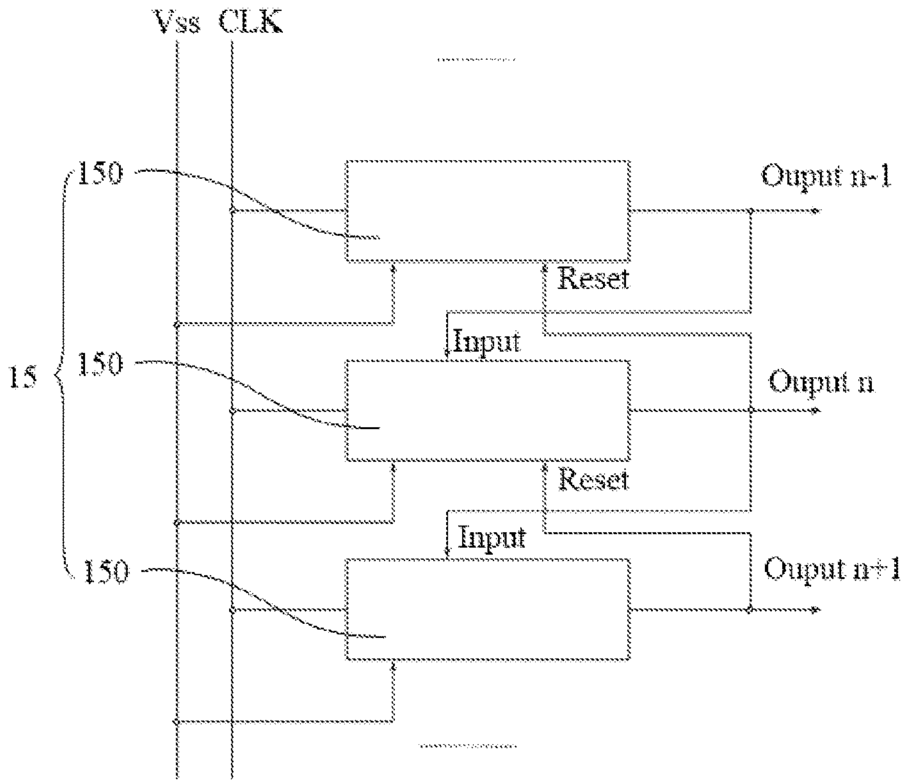
FIG. 3 is a cascade structural schematic view of a scan driving circuit according to some embodiments of the present disclosure.

As shown in FIG. 3, FIG. 3 is a cascade structural schematic view of a scan driving circuit according to some embodiments of the present disclosure.

The scan driving circuit 15 is arranged on a side of the first substrate 10 close to the second substrate 20 and is connected to the scan lines 12, the clock signal line CLK, and the low-level signal line Vss, respectively. The scan driving circuit 15 includes multiple scan driving units 150 which are cascaded. An input signal (Input) of the scan driving unit 150 at a current stage is an output signal (Output) of the scan driving unit 150 at a previous stage, and a reset signal (Reset) of the scan driving unit 150 at the current stage is an Output of the scan driving unit 150 at a next stage. For the scan driving unit 150 at the first stage, a frame start signal (not shown) is taken as the Input since there is no scan driving unit 150 at the previous stage. For the scan driving unit 150 at the last stage, since there is no scan driving unit 150 at the last stage to provide the reset signal, an additional redundant scan driving unit (not shown) may be designed, which provides the reset signal to the last row.

Figure 4:
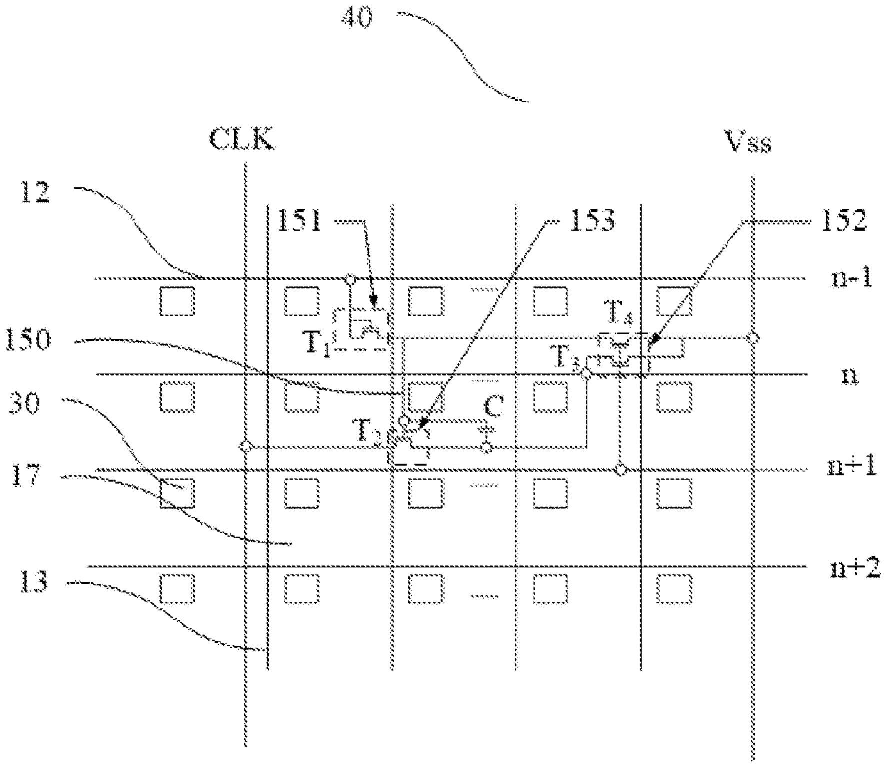
FIG. 4 is a structural schematic view of a scan driving unit of the driving substrate according to a first embodiment of the present disclosure.

As shown in FIG. 4, FIG. 4 is a structural schematic view of a scan driving unit of the driving substrate according to a first embodiment of the present disclosure.

Each scan driving unit 150 includes a charging unit 151, a resetting unit 152, an outputting unit 153, and at least one capacitor C. The charging unit 151 is configured to receive the Output of the scan driving unit 150 at the previous stage and charge the at least one capacitor C. The resetting unit 152 is configured to receive the Output of the scan driving unit 150 at the next stage and discharge the at least one capacitor C, such that the scan driving unit 150 at the current stage may be reset. The outputting unit 153 is configured to output the gate scanning signal to the scan lines 12. The charging unit 151, the resetting unit 152, and the outputting unit 153 all include thin film transistors. That is, each scan driving unit 150 includes multiple thin film transistors and the at least one capacitor C.

The same scan driving unit 150 is arranged in pixel regions 17 which are located in at least two rows, and capable of outputting at least one row of the gate scanning signal. That is, the multiple thin film transistors are distributed in the pixel regions 17 which are located in at least two rows, and the outputting unit 153 is connected to at least one of the multiple scan lines 12.

A single scan driving unit 150 including four thin film transistors and one capacitor C will be taken as an example in the following description.

The scan driving unit 150 includes a first thin film transistor $T_1$, a second thin film transistor $T_2$, a third thin film transistor $T_3$, a fourth thin film transistor $T_4$, and a capacitor C. The first thin film transistor $T_1$ is configured as the charging unit 151, and the second thin film transistor $T_2$ is configured as the outputting unit 153, the third thin film transistor $T_3$ and the fourth thin film transistor $T_4$ are cooperatively configured as one resetting unit 152. The first thin film transistor $T_1$, the third thin film transistor $T_3$, and the fourth thin film transistor $T_4$ are all arranged in pixel regions 17 which are located in a row between the scan line 12 in the $(n-1)^{th}$ row and the scan line 12 in the $n^{th}$ row. The second thin film transistor $T_2$ is arranged in the pixel regions 17 which are located in a row between the scan line 12 in the $n^{th}$ row and a scan line 12 in the $(n+1)^{th}$ row.

A gate of the first thin film transistor $T_1$ is connected to a source of the first thin film transistor $T_1$, and is connected to the scan line 12 in the $(n-1)^{th}$ (n is an integer greater than or equal to 1, and less than m) row, i.e., connected to an output terminal of the gate scanning signal at a previous stage. A drain of the first thin film transistor $T_1$ is connected to a source of the fourth thin film transistor $T_4$ and a gate of the second thin film transistor $T_2$. A source of the second thin film transistor $T_2$ is connected to the clock signal line CLK, so as to be provided with the clock signal. A drain of the second thin film transistor $T_2$ is connected to the scan line 12 in the $n^{th}$ row, so as to output the gate scanning signal of the scan line 12 in the $n^{th}$ row. A gate of the third thin film transistor $T_3$ and a gate of the fourth thin film transistor $T_4$ are connected to the scan line 12 in the $(n+1)^{th}$ row. A source of the third thin film transistor $T_3$ is connected to the scan line 12 in the $n^{th}$ row. A drain of the third thin film transistor $T_3$ and a drain of the fourth thin film transistor $T_4$ are connected to the low-level signal line Vss. The capacitor C is connected to the gate of the second thin film transistor $T_2$ and the drain of the second thin film transistor $T_2$. In the present embodiment, in the same scan driving unit 150, the gate of the first thin film transistor $T_1$, the drain of the second thin film transistor $T_2$, and the gate of the third thin film transistor $T_3$ are connected to different scan lines, respectively. That is, the gate of the first thin film transistor $T_1$ is connected to a first scan line, the drain of the second thin film transistor $T_2$ is connected to a second scan line, the gate of the third thin film transistor $T_3$ is connected to a third scan line, and the first scan line, the second scan line, and the third scan line are different from each other. The gate of the third thin film transistor $T_3$ and the gate of the fourth thin film transistor $T_4$ are connected to a same scan line 12 (i.e., the third scan line 12), and the source of the third thin film transistor $T_3$ and the drain of the second thin film transistor $T_2$ are connected to a same scan line 12 (i.e., the second scan line 12).

In the present embodiment, the scan driving unit 150 simply or only outputs the gate scanning signal of the scan line 12 in the $n^{th}$ row. The first thin film transistor $T_1$, the fourth thin film transistor $T_4$, and the third thin film transistor $T_3$ are located in the pixel regions 17 which are located in the same row. That is, the charging unit 151 and the resetting unit 152 are located in the pixel regions 17 in the same row. The second thin film transistor $T_2$ is located in the pixel regions 17 which are located in another row, i.e., the outputting unit 153 is located in the pixel regions 17 which are located in another row. The single scan driving unit 150 is arranged in the pixel regions 17 which are located in two rows, such that a space occupied by the single scan driving unit 150 in the pixel regions 17 in a single row may be reduced. The third thin film transistor $T_3$ and the fourth thin film transistor $T_4$ are located in the pixel regions 17 which are located in a same column. The first thin film transistor $T_1$, the second thin film transistor $T_2$, and the third thin film transistor $T_3$ are located in the pixel regions 17 located in different columns. That is, the single scan driving unit 150 is disposed in pixel regions 17 in multiple columns, such that a space occupied by the single scan driving unit 150 in pixel regions 17 in a single column may be reduced. In some embodiments, the first thin film transistor $T_1$, the fourth thin film transistor $T_4$, and the third thin film transistor $T_3$ may also be located in the pixel regions 17 in rows different from each other, and the third thin film transistor $T_3$ and the fourth thin film transistor $T_4$ may also be located in the pixel regions in columns different from each other. That is, the single scan driving unit 150 may be located either in the pixel regions 17 in the multiple rows or in the pixel regions 17 in the multiple columns. The thin film transistors in each scan driving unit 150 may be dispersed or distributed in the pixel regions 17 in the different rows in various ways, such that a distance between the light-emitting unit 30 in the pixel regions 17 in a row and the light-emitting units 30 in the pixel regions 17 in an adjacent row may be reduced, thereby improving a resolution of the display panel 100.

Figure 5:
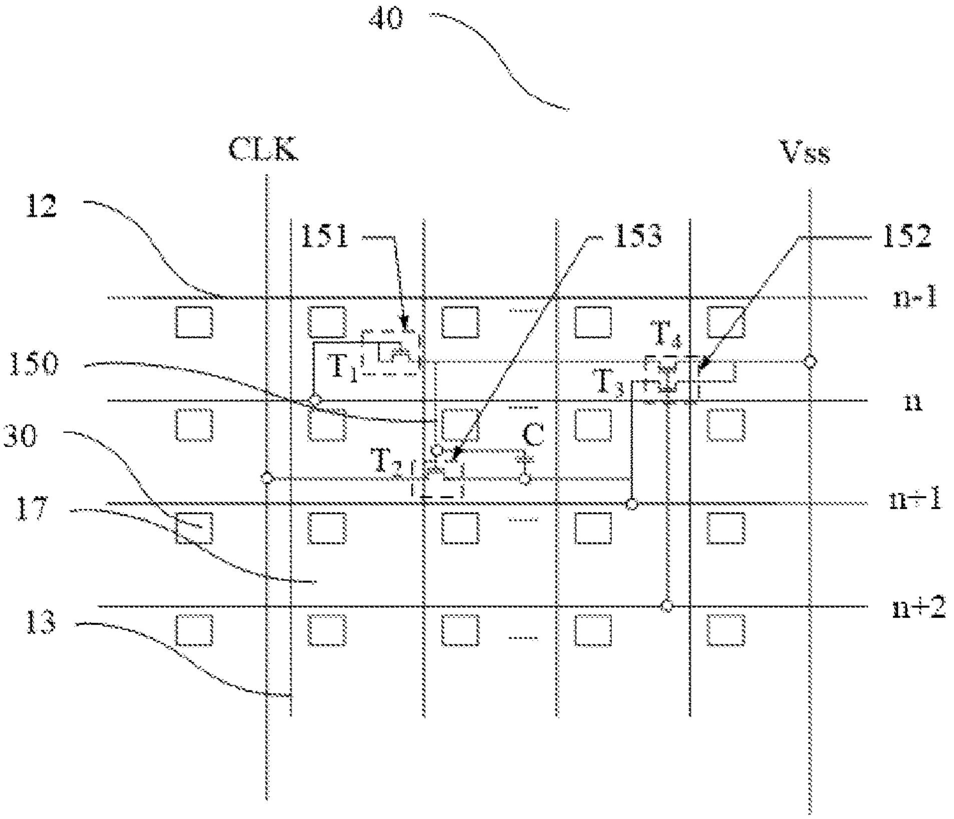
FIG. 5 is a structural schematic view of a scan driving unit of the driving substrate according to a second embodiment of the present disclosure.

As shown in FIG. 5, FIG. 5 is a structural schematic view of a scan driving unit of the driving substrate according to a second embodiment of the present disclosure.

The scan driving unit 150 provided in the second embodiment of the present disclosure has substantially the same structure as the scan driving unit 150 provided in the first embodiment, with a difference that the scan driving units 150 at the same stage may output the gate scanning signal to a scan line 12 corresponding to the pixel regions 17 spaced at least one row away from the scan driving unit 150 at the same stage.

Specifically, the gate of the first thin film transistor $T_1$ is connected to the source of the first thin film transistor $T_1$, and is connected to the scan line 12 in the $n^{th}$ row, i.e., connected to the output terminal of the gate scanning signal of the previous stage. The drain of the second thin film transistor $T_2$ is connected to the scan line 12 in the $(n+1)^{th}$ row, so as to output the gate scanning signal of the scan line 12 in the $(n+1)^{th}$ row. The gate of the third thin film transistor $T_3$ and the gate of the fourth thin film transistor $T_4$ are connected to the scan line 12 in the $(n+2)^{th}$ row. The source of the third thin film transistor $T_3$ is connected to the scan line 12 in the $(n+1)^{th}$ row. The scan driving unit 150 is arranged in the pixel regions 17 defined by the scan line 12 in the $(n-1)^{th}$ row and the scan line 12 in the $n^{th}$ row, and outputs the gate scanning signal to the scan line 12 in the $(n+1)^{th}$ row corresponding to the pixel regions 17 spaced one row away from the scan driving unit 150. In some embodiments, the same scan driving unit 150 may output the gate scanning signal to the scan line 12 corresponding to the pixel regions 17 spaced two or more rows away from the scan driving unit 150. Since the scan driving units 150 at the same stage may output the gate scanning signal to the scan line 12 corresponding to the pixel regions 17 spaced at least one row away from the scan driving units 150 at the same stage, the scan driving unit 150 may output the gate scanning signal to the scan line 12 corresponding to the pixel regions 17 arranged with the other lines 16 when the other lines 16 are arranged in the pixel regions 17. After the other lines 16 are placed in the display region 111, without an influence in arranging the scan driving units 150 at both ends of the display region 111 along the extending direction of the data line 13, the upper side and lower side of the display may realize a frameless design.

Figure 6:
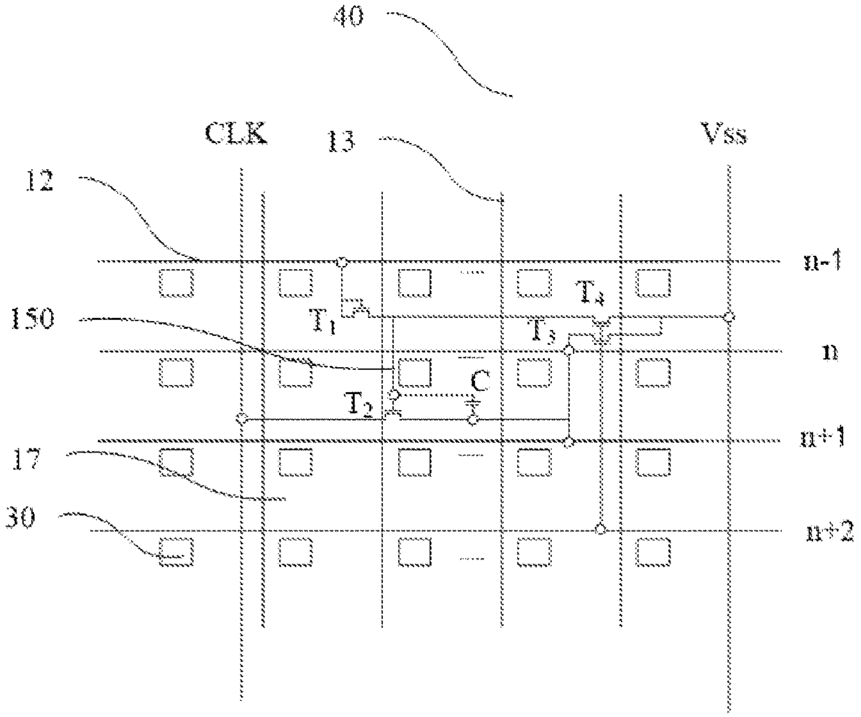
FIG. 6 is a structural schematic view of a scan driving unit of the driving substrate according to a third embodiment of the present disclosure.

As shown in FIG. 6, FIG. 6 a structural schematic view of a scan driving unit of the driving substrate according to a third embodiment of the present disclosure.

The scan driving unit 150 provided by the third embodiment of the present disclosure has substantially the same structure as the scan driving unit 150 provided in the first embodiment, with a difference that the single scan driving unit 150 may simultaneously output at least two rows of gate scanning signals.

Specifically, the drain of the second thin film transistor $T_2$ is connected to the scan line 12 in the $n^{th}$ row and the scan line 12 in the $(n+1)^{th}$ row, respectively, so as to simultaneously output the gate scanning signal of the scan line 12 in the $n^{th}$ row and the gate scanning signal of the scan line 12 in the $(n+1)^{th}$ row. The gate of the third thin film transistor $T_3$ and the gate of the fourth thin film transistor $T_4$ are respectively connected to the scan line 12 in the $(n+2)^{th}$ row. The drain of the third thin film transistor $T_3$ is connected to the scan line 12 in the $n^{th}$ row and the scan line 12 in the $(n+1)^{th}$ row respectively. In the present embodiment, the scan driving unit 150 simultaneously outputs the gate scanning signals of the two rows, and the second thin film transistor $T_2$ is located in the pixel regions 17 between the scan line 12 in the $n^{th}$ row and the scan line 12 in the $(n+1)^{th}$ row, so as to facilitate an electrical connection between the scan line 12 in the $n^{th}$ row and the scan line 12 in the $(n+1)^{th}$ row. In some embodiments, the drain of the second thin film transistor $T_2$ may be connected to more than two scan lines 12 to output multiple rows of gate scan signals simultaneously. One scan driving unit 150 outputs gate scan signals to the scan lines 12 in the multiple rows, which may reduce the number of the scan driving units 150. In this way, a row spacing between light-emitting units 30 in two rows of the pixel regions 17 may be reduced, thereby improving the resolution of the display panel 100.

Figure 7:
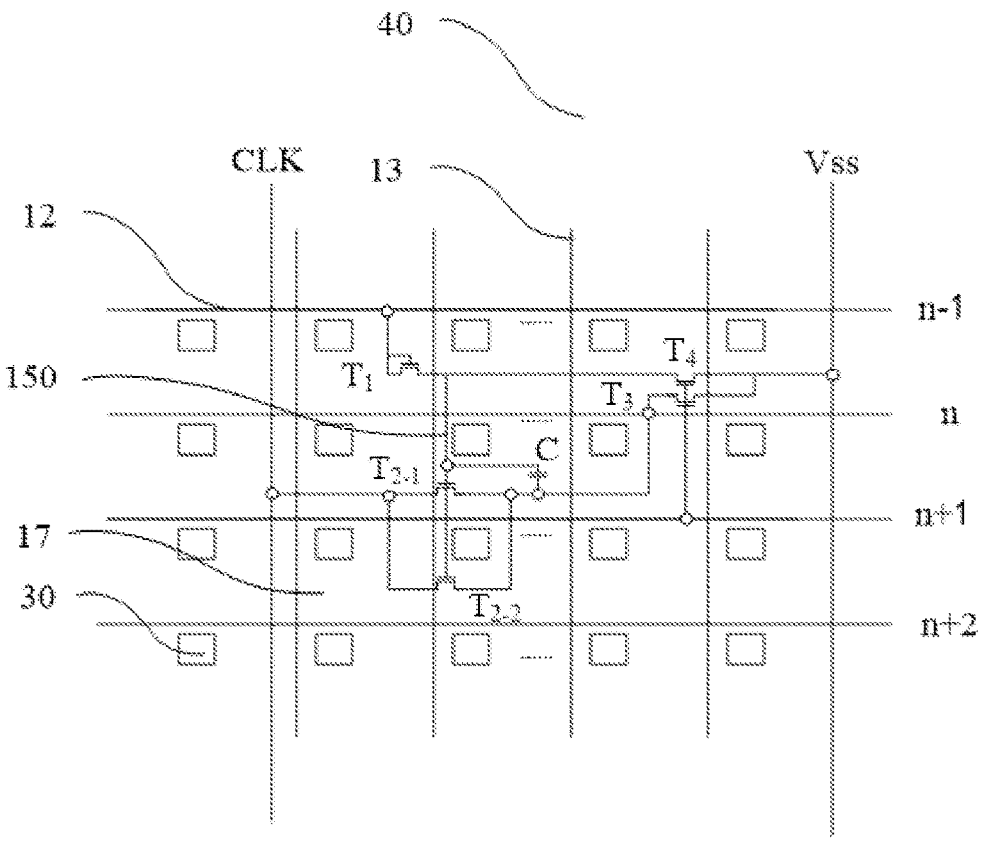
FIG. 7 is a structural schematic view of a scan driving unit of the driving substrate according to a fourth embodiment of the present disclosure.

As shown in FIG. 7, FIG. 7 is a structural schematic view of a scan driving unit of the driving substrate according to a fourth embodiment of the present disclosure.

The scan driving unit 150 provided by the fourth embodiment of the present disclosure has substantially the same structure as the scan driving unit 150 provided in the first embodiment, with a difference that a single thin film transistor having a larger volume is divided into multiple sub thin film transistors, and the multiple sub thin film transistors are arranged in parallel and dispersed or distributed in the pixel regions 17 in the at least two rows.

Specifically, the second thin film transistor $T_2$ is divided into two sub thin film transistors. The two sub thin film transistors are connected in parallel. The two sub thin film transistors include a first sub thin film transistor $T_{2-1}$ and a second sub thin film transistor $T_{2-2}$, respectively. The first thin film transistor $T_1$, the third thin film transistor $T_3$, and the fourth thin film transistor $T_4$ are all disposed in the pixel regions 17 in the row between the scan line 12 in the $(n-1)^{th}$ row and the scan line 12 in the $n^{th}$ row. The first sub thin film transistor $T_{2-1}$ is arranged in the pixel regions 17 in a row between the scan line 12 in the $n^{th}$ row and the scan line 12 in the $(n+1)^{th}$ row. The second sub thin film transistor $T_{2-2}$ is arranged in the pixel regions 17 in a row between the scan line 12 in the $(n+1)^{th}$ row and the scan line 12 in the $(n+2)^{th}$ row. A drain of the first sub thin film transistor $T_{2-1}$ and a drain of the second sub thin film transistor $T_{2-2}$ are respectively connected to the scan line 12 in the $n^{th}$ row, and are also connected to an end of the capacitor C, respectively, so as to output the gate scanning signal of the scan line 12 in the $n^{th}$ row. A gate of the first sub thin film transistor $T_{2-1}$ and a gate of the second sub thin film transistor $T_{2-2}$ are respectively connected to the drain of the first thin film transistor $T_1$, and are also connected to the other end of the capacitor C, respectively. A source of the first sub thin film transistor $T_{2-1}$ and a source of the second sub thin film transistor $T_{2-2}$ are connected to the clock signal line CLK, respectively. The gate of the third thin film transistor $T_3$ and the gate of the fourth thin film transistor $T_4$ are respectively connected to the scan line 12 in the $(n+1)^{th}$ row, and the source of the third thin film transistor $T_3$ is connected to the scan line 12 in the $n^{th}$ row. The first sub thin film transistor $T_{2-1}$ and the second sub thin film transistor $T_{2-2}$ are located in the pixel regions 17 in different rows and in the pixel regions 17 in the same column. In some embodiments, the sub thin film transistors may be located in the pixel regions 17 in the same row, or may be located in the pixel regions 17 in different columns, which are designed according to actual requirements and not limited herein. The second thin film transistor $T_2$ is a switch thin film transistor in the outputting unit 153, and a single switch thin film transistor has a volume greater than a volume of the single thin film transistor in the charging unit 151 and a volume of the single thin film transistor in the resetting unit 152. A space occupied by the single thin film transistor in a row of pixel regions 17 may be reduced to a greater extent by dividing the switch thin film transistor. In some embodiments, the single thin film transistor in the charging unit 151 and the single thin film transistor in the resetting unit 152 may also be divided, which is not limited herein and is designed according to actual needs. The single thin film transistor is divided such that the single thin film transistor may be arranged in the pixel regions 17 in the multiple rows. In this way, the row spacing between the light-emitting units 30 in the pixel regions 17 may be reduced, thereby improving the resolution of the display panel 100.

Figure 8:
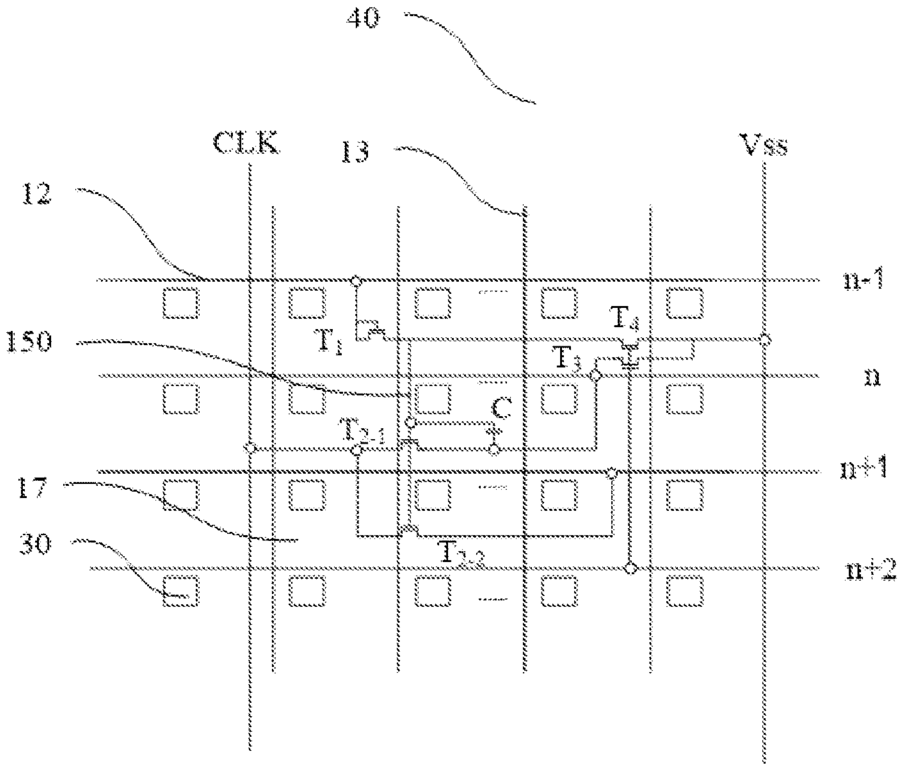
FIG. 8 is a structural schematic view of a scan driving unit of the driving substrate according to a fifth embodiment of the present disclosure.

As shown in FIG. 8, FIG. 8 is a structural schematic view of a scan driving unit of the driving substrate according to a fifth embodiment of the present disclosure.

The scan driving unit 150 provided in the fifth embodiment of the present disclosure substantially has the same structure as the scan driving unit 150 provided in the fourth embodiment, with a difference that the scan line 12 connected to the drain of the first sub thin film transistor $T_{2-1}$ is different from the scan line 12 connected to the drain of the second sub thin film transistor $T_{2-2}$.

Specifically, the first sub thin film transistor $T_{2-1}$ and the second sub-thin film transistor $T_{2-2}$ have the same volume, the gate of the third thin film transistor $T_3$ and the gate of the fourth thin film transistor $T_4$ are respectively connected to the scan line 12 in the $(n+2)^{th}$ row. The source of the third thin film transistor $T_3$ is connected to the scan line 12 in the $n^{th}$ row, and connected to an end of the capacitor C. The drain of the first sub thin film transistor $T_{2-1}$ is connected to the scan line 12 in the $n^{th}$ row, and the drain of the second sub thin film transistor $T_{2-2}$ is connected to the scan line 12 in the $(n+1)^{th}$ row. The end of the capacitor C is connected to the gate of the first sub thin film transistor $T_{2-1}$ and the gate of the second sub thin film transistor $T_{2-2}$ respectively, and the other end of the capacitor C is simply connected to the drain of the first sub thin film transistor $T_{2-1}$. In the present embodiment, the first sub thin film transistor $T_{2-1}$ outputs the gate scanning signal to the scan line 12 in the $n^{th}$ row, and the second sub thin film transistor $T_{2-2}$ outputs the gate scanning signal to the scan line 12 in the $(n+1)^{th}$ row. In some embodiments, the end of the capacitor C is connected to the gate of the first sub thin film transistor $T_{2-1}$ and the gate of the second sub thin film transistor $T_{2-2}$ respectively, and the other end of the capacitor C is simply connected to the drain of the first sub thin film transistor $T_{2-1}$. The drain of the second sub thin film transistor $T_{2-2}$ is connected to the drain of the first sub thin film transistor $T_{2-1}$, and is connected to the scan line 12 in the $n^{th}$ row. The first sub thin film transistor $T_{2-1}$ and the second sub-thin film transistor $T_{2-2}$ jointly output the gate scanning signal to the scan line 12 in the $n^{th}$ row. Since the single thin film transistor in the single scan driving unit 150 may output two rows of gate scanning signals simultaneously, the number of the scan driving units 150 may be reduced in the present embodiment compared with the fourth embodiment, such that the row spacing between the light-emitting units 30 in the two rows of pixel regions 17 may be less, thereby improving the resolution of the display panel 100 to a greater extent.

It can be understood that a volume of the first sub thin film transistor $T_{2-1}$ may be different from a volume of the second sub thin film transistor $T_{2-2}$, and the volume of the first sub thin film transistor $T_{2-1}$ is greater than the volume of the second sub thin film transistor $T_{2-2}$. The first sub thin film transistor $T_{2-1}$ controls pixels in the $n^{th}$ row to be charged to a preset value, and the second sub thin film transistor $T_{2-2}$ controls pixels in the $(n+1)^{th}$ row to be pre-charged. A gate voltage for pre-charging may be less, which may save power. When charging pixels in a previous row, pixels in a next row are pre-charged simultaneously, such that a charging speed and a charging effect may be improved when the pixels in the next row are charged.

Figure 9:
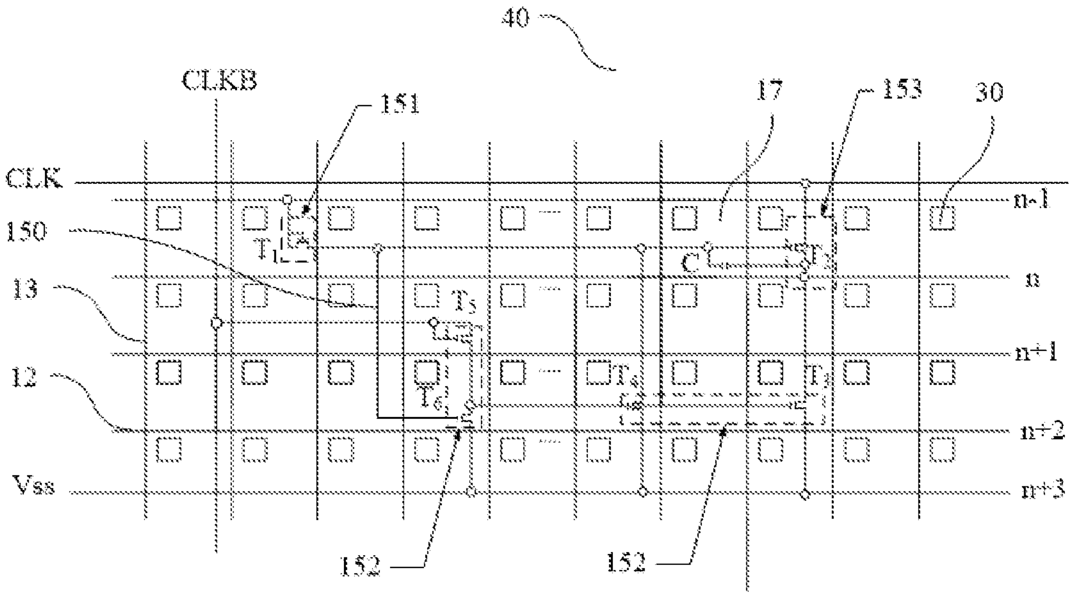
FIG. 9 is a structural schematic view of a scan driving unit of the driving substrate according to a sixth embodiment of the present disclosure.

As shown in FIG. 9. FIG. 9 is a structural schematic view of a scan driving unit of the driving substrate according to a sixth embodiment of the present disclosure.

A difference between the scan driving unit 150 provided in the sixth embodiment of the present disclosure and the scan driving unit 150 provided in the first embodiment of the present disclosure is that the numbers of the thin film transistors included in the scan driving units 150 are different from each other.

Specifically, the scan driving unit 150 includes six thin film transistors and one capacitor C. The six thin film transistors include the first thin film transistor $T_1$, the second thin film transistor $T_2$, the third thin film transistor $T_3$, the fourth thin film transistor $T_4$, a fifth thin film transistor $T_5$, and a sixth thin film transistor $T_6$. The first thin film transistor $T_1$ is configured as the charging unit 151, the second thin film transistor $T_2$ is configured as the outputting unit 153, the third thin film transistor $T_3$ and the fourth thin film transistor $T_4$ are cooperatively configured as one resetting unit 152, and the fifth thin film transistor $T_5$ and the sixth thin film transistor $T_6$ are cooperatively configured as another resetting unit 152. Compared with the scan driving unit 150 including four thin film transistors and one capacitor C, the number of the resetting units 152 of the scan driving unit 150 in the present embodiment is increased from one to two, and a clock signal line CLKB is also added. Voltages of the clock signal line CLK and the clock signal line CLKB are in the opposite phases. The clock signal line CLK and the clock signal line CLKB are arranged substantially perpendicular to each other, and the clock signal line CLK is substantially parallel to the low-level signal line Vss. The gate and the source of the first thin film transistor $T_1$ are connected to each other and are connected to the scan line 12 in the $(n-1)^{th}$ row. The drain of the first thin film transistor $T_1$ is respectively connected to the gate of the second thin film transistor $T_2$ and a gate of the sixth thin film transistor $T_6$, and further connected to the source of the fourth thin film transistor $T_4$. The source of the second thin film transistor $T_2$ is connected to the clock signal line CLK, and the drain of the second thin film transistor $T_2$ is connected to the scan line 12 in the $n^{th}$ row to output the gate scanning signal of the scan line 12 in the $n^{th}$ row. The gate of the third thin film transistor $T_3$ is connected to a drain of the fifth thin film transistor $T_5$ and a source of the sixth thin film transistor $T_6$, respectively. The drain of the third thin film transistor $T_3$ is connected to the low-level signal line Vss. The source of the third thin film transistors $T_3$ is connected to the scan line 12 in the $n^{th}$ row. The gate of the fourth thin film transistor $T_4$ is connected to the drain of the fifth thin film transistor $T_5$ and the source of the sixth thin film transistor $T_6$ respectively. The drain of the fourth thin film transistor $T_4$ is connected to the low-level signal line Vss. The fifth thin film transistor $T_5$ and the sixth thin film transistor $T_6$ are connected in series. A source and a gate of the fifth thin film transistor $T_5$ are connected to each other, and connected to the clock signal line CLKB. A drain of the sixth thin film transistor $T_6$ is connected to the low-level signal line Vss. An end of the capacitor C is connected to the gate of the second thin film transistor $T_2$ and the other end of the capacitor C is connected to the drain of the second thin film transistor $T_2$. In the present embodiment, the first thin film transistor $T_1$ and the second thin film transistor $T_2$ are located in the pixel regions 17 in the $(n-1)^{th}$ row, the fifth thin film transistor $T_5$ is located in the pixel regions 17 in the $n^{th}$ row, and the third thin film transistor $T_3$, the fourth thin film transistor $T_4$, and the sixth thin film transistor $T_6$ are located in the pixel regions 17 in the $(n+1)^{th}$ row. The scan driving unit 150 is arranged in the pixel regions 17 in three different rows. That is, the charging unit 151 and the outputting unit 153 are located in the pixel regions 17 in one row, and the resetting unit 152 is located in the pixel regions 17 in a different row from the charging unit 151 and the outputting unit 153. In some embodiments, the resetting unit 152, the charging unit 151, and the outputting unit 153 may each be located in pixel regions 17 in a different row. The technical solution disclosed in some embodiments of the present disclosure is not only applicable to the simplest scan driving unit 150, such as the scan driving unit 150 in the first embodiment, but also applicable to the scan driving unit 150 with more thin film transistors and a more complex structure.

Figure 10:
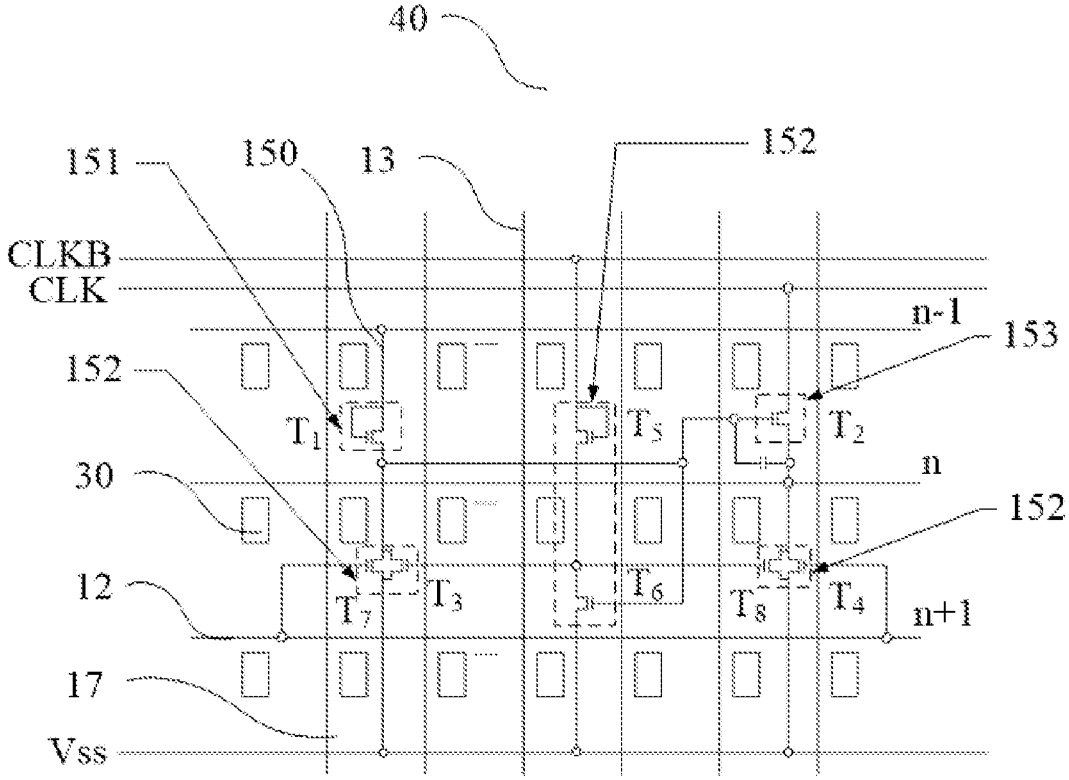
FIG. 10 is a structural schematic view of a scan driving unit of the driving substrate according to a seventh embodiment of the present disclosure.

As shown in FIG. 10, FIG. 10 is a structural schematic view of a scan driving unit of the driving substrate according to a seventh embodiment of the present disclosure.

A difference between the scan driving unit 150 provided in the seventh embodiment of the present disclosure and the scan driving unit 150 provided in the first embodiment of the present disclosure is that the numbers of the thin film transistors included in the scan driving unit 150 are different from each other.

In the present embodiment, the scan driving unit 150 includes eight thin film transistors and one capacitor C. The eight thin film transistors include the first thin film transistor $T_1$, the second thin film transistor $T_2$, the third thin film transistor $T_3$, the fourth thin film transistor $T_4$, the fifth thin film transistor $T_5$, the sixth thin film transistor $T_6$, a seventh thin film transistor $T_7$, and an eighth thin film transistor thin film transistor $T_8$. The first thin film transistor $T_1$ is configured as the charging unit 151, the second thin film transistor $T_2$ is configured as the outputting unit 153, the third thin film transistor $T_3$ and the seventh thin film transistor $T_7$ are cooperatively configured as a first resetting unit 152, the fifth thin film transistor $T_5$ and the sixth thin film transistor $T_6$ are cooperatively configured as a second resetting unit 152, and the eighth thin film transistor $T_8$ and the fourth thin film transistor $T_4$ are cooperatively configured as a third resetting unit 152. Compared with the scan driving unit 150 including four thin film transistors and one capacitor C, the number of the resetting units 152 of the scan driving unit 150 in the present embodiment is increased from one to three, and the clock signal line CLKB is also added. The voltages of the clock signal line CLK and the clock signal line CLKB are in the opposite phase. The clock signal line CLK, the clock signal line CLKB, and the low-level signal line Vss are arranged substantially parallel to the scan line 12. The gate and the source of the first thin film transistor $T_1$ are connected to each other and are connected to the scan line 12 in the $(n-1)^{th}$ row. The drain of the first thin film transistor $T_1$ is respectively connected to the source of the third thin film transistor $T_3$ and a source of the seventh thin film transistor $T_7$, and further connected to the gate of the second thin film transistor $T_2$ and the gate of the sixth thin film transistor $T_6$. The source of the second thin film transistor $T_2$ is connected to the clock signal line CLK, and the drain of the second thin film transistor $T_2$ is connected to the scan line 12 in the $n^{th}$ row to output the gate scanning signal of the scan line 12 in the $n^{th}$ row. The third thin film transistor $T_3$ and the seventh thin film transistor $T_7$ are connected in parallel. The gate of the third thin film transistor $T_3$ is connected to a gate of the eighth thin film transistor $T_8$ and the source of the sixth thin film transistor $T_6$. The drain of the third thin film transistor $T_3$ is connected to a drain of the seventh thin film transistor $T_7$, and is connected to the scan line 12 in the $(n+1)^{th}$ row. The source of the third thin film transistors $T_3$ is connected to the source of the seventh thin film transistor $T_7$. The fifth thin film transistor $T_5$ and the sixth thin film transistor $T_6$ are connected in series. The source and the gate of the fifth thin film transistor $T_5$ are connected to each other, and connected to the clock signal line CLKB. The drain of the fifth thin film transistor $T_5$ is connected to the source of the sixth thin film transistor $T_6$. The gate of the sixth thin film transistor $T_6$ is connected to the gate of the second thin film transistor $T_2$. The drain of the sixth thin film transistor $T_6$ is connected to the low-level signal line Vss. The source of the sixth thin film transistor $T_6$ is connected to the gate of the third thin film transistor $T_3$ and the gate of the eighth thin film transistor $T_8$. The eighth thin film transistor $T_8$ and the fourth thin film transistor $T_4$ are connected in parallel. A source of the eighth thin film transistor $T_8$ is connected to the source of the fourth thin film transistor $T_4$, and connected to the scan line 12 in the $n^{th}$ row. A drain of the eighth thin film transistor $T_8$ is connected to the drain of the fourth thin film transistor $T_4$ and connected to the low-level signal line Vss. The gate of the fourth thin film transistor $T_4$ is connected to the scan line 12 in the $(n+1)^{th}$ row. An end of the capacitor C is connected to the gate of the second thin film transistor $T_2$ and the other end of the capacitor C is connected to the drain of the second thin film transistor $T_2$. In the present embodiment, the first thin film transistor $T_1$, the second thin film transistor $T_2$, and the fifth thin film transistor $T_5$ are located in the pixel regions 17 in the $(n-1)^{th}$ row. The third thin film transistor $T_3$, the fourth thin film transistor $T_4$, the sixth thin film transistor $T_6$, the seventh thin film transistor $T_7$, and the eighth thin film transistor $T_8$ are located in the pixel regions 17 in the $n^{th}$ row. The scan driving unit 150 is arranged in the pixel regions 17 which are located in two different rows. The number of the thin film transistors of the scan driving unit 150 in the present disclosure is greater than the number of the thin film transistors of the scan driving unit 150 in the sixth embodiment, while the number of rows of the pixel regions 17 occupied by the scan driving unit 150 is less. It can be understood that the technical solution of the present disclosure is not only applicable to the simplest scan driving unit 150, such as the scan driving unit 150 in the first embodiment, but also applicable to the scan driving unit 150 with more thin film transistors and the more complex structure. In addition, the number of the rows of the pixel regions 17 occupied by the scan driving unit 150 may not increase with an increase of the number of the thin film transistors of the scan driving unit 150.

Figure 11:
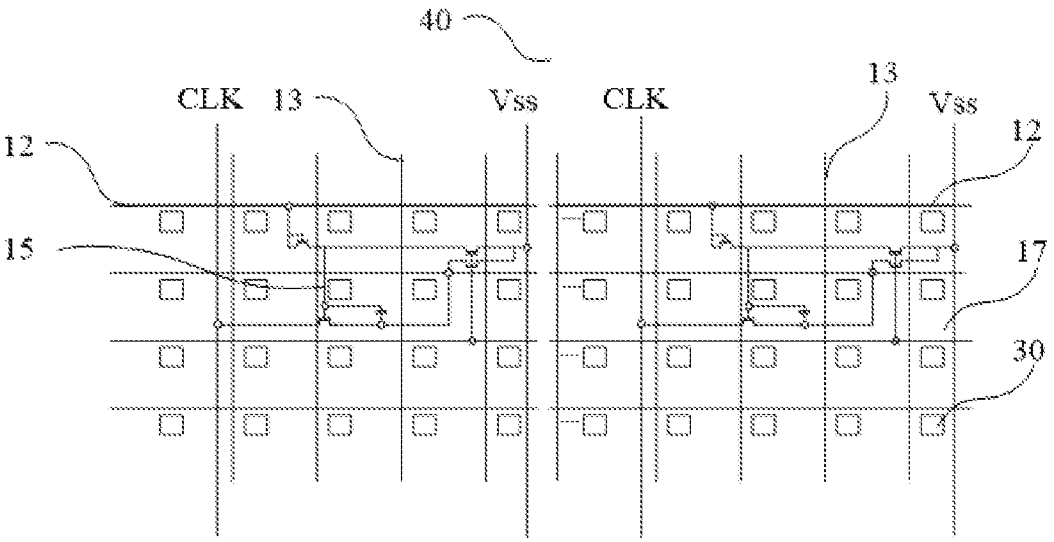
FIG. 11 is a structural schematic view of a driving panel according to another embodiment of the present disclosure.

As shown in FIGS. 4 and 11, FIG. 11 is a structural schematic view of a driving panel according to another embodiment of the present disclosure.

A structure of the driving substrate 40 provided in FIG. 11 of the present disclosure has substantially the same structure as a scanning driving substrate 40 provided in FIG. 2, with a difference that the scan line 12 in the same row may be divided into multiple segments for driving, and each segment of scan line 12 may also be driven by one or two scan driving units 150.

Specifically, all the scan lines 12 are divided into two parts along the extending direction of the scan lines 12. A division position of the scan line 12 in each row is the same. A scan driving unit 150 is arranged in the pixel regions 17 in each row in each part of the scan lines 12. The scan driving units 150 are dispersed or distributed in the pixel regions 17 in the two rows, and all the light-emitting units 30 have the same row spacing and the same column spacing. Each part of the scan lines 12 includes one clock signal line CLK and one low-level signal line Vss. In some embodiments, the division positions of the scan lines 12 in different rows may be different from each other, numbers of divisional segments of the scan line 12 in different rows may also be different from each other, and the numbers of the scan driving units 150 in each segment of the scan line 12 may also be different from each other, which is not further limited herein and is designed based on an actual situation. By means of dividing the scan line 12 into multiple segments, and outputting the gate scanning signal to each segment of the scan line 12 separately, a driving load of the scan line 12 may be reduced.

Disclosed is a driving substrate in the present disclosure. The driving substrate is configured to drive the light-emitting unit to emit light and includes the base, the multiple rows of scan lines, the multiple data lines, and the scan driving circuit. The base includes the display region. The multiple rows of scan lines and the multiple data lines are arranged on the base. The multiple pixel regions are defined by the multiple rows of scan lines and the multiple data lines crossing each other longitudinally and horizontally. The pixel regions are located in the display region. The row directions of the multiple pixel regions are substantially parallel to the scan lines. The scan driving circuit is arranged in the display region of the base and includes the multiple scan driving units which are cascaded. The same scan driving unit is arranged in the pixel regions in the at least two rows, and capable of outputting at least one row of the gate scanning signal. By distributing the single scan driving unit being distributed in the pixel regions in multiple rows, the space occupied by the scan driving unit in the pixel regions in each row may be reduced. In this way, the row spacing between the light-emitting units in the pixel regions may be reduced, thereby improving the resolution of the display panel.

The above is only some embodiments of the present disclosure and is not intended to limit the scope of the present disclosure. Any equivalent structure or equivalent process transformation using the specification and the accompanying drawings of the present disclosure, or direct or indirect application in other related technical fields, is included in the scope of the present disclosure.

What is claimed is:

1. A driving substrate, configured to drive a light-emitting unit to emit light, comprising:

a base, comprising a display region;

a plurality of rows of scan lines and a plurality of data lines, arranged on the base; wherein a plurality of pixel regions are defined by the plurality of rows of scan lines and the plurality of data lines crossing each other substantially longitudinally and horizontally, the plurality of pixel regions are located in the display region, and row directions of the plurality of pixel regions are substantially parallel to the scan lines; and a scan driving circuit, arranged in the display region of the base and comprising a plurality of scan driving units which are cascaded;

wherein a same scan driving unit is arranged in pixel regions in at least two rows among the plurality of pixel regions and capable of outputting at least one row of gate scanning signal;

wherein the scan driving unit comprises a charging unit, a resetting unit, and an outputting unit connected to a clock signal line;

the outputting unit is located in the pixel regions in one or two rows, and the charging unit and the resetting unit are located in the pixel regions in another row different from the rows in which the pixel regions having the outputting unit is located; or the outputting unit is located in pixel regions in a first row, the charging unit is located in pixel regions in a second row, the resetting unit is located in pixel regions in a third row, and the first row, the second row, and the third row are different from each other;

the scan driving unit comprises a plurality of thin film transistors, and the plurality of thin film transistors are distributed in the pixel regions in two or three rows;

the scan driving unit comprises a first thin film transistor, a second thin film transistor, a third thin film transistor, a fourth thin film transistor, and a capacitor;

a source of the first thin film transistor is connected to a gate of the first thin film transistor and an output terminal of the gate scanning signal at a previous stage, and a drain of the first thin film transistor is connected to a source of the fourth thin film transistor and a gate of the second thin film transistor;

a source of the second thin film transistor is provided with a clock signal, and a drain of the second thin film transistor is connected to at least one row of the scan lines to output at least one row of the gate scanning signal;

a gate of the third thin film transistor and a gate of the fourth thin film transistor are connected to a first scan line, and a source of the third thin film transistor and the drain of the second thin film transistor are connected to a second scan line; a drain of the third thin film transistor and a drain of the fourth thin film transistor is provided with a low-level signal;

the capacitor is connected to the gate of the second thin film transistor and the drain of the second thin film transistor;

wherein the gate of the first thin film transistor is connected to a third scan line, and the first scan line, the second scan line, and the third scan line are different from each other.

2. The driving substrate according to claim 1, wherein the number of the rows of scan lines is m, m rows of scan lines are defined as a scan line in a $1^{st}$ row, a scan line in a $2^{nd}$ row, a scan line in a $3^{rd}$ row, . . . , and a scan line in an $m^{th}$ row;

the scan driving circuit is arranged in pixel regions defined by the scan lines in the $2^{nd}$ row to the $(m-1)^{th}$ row, and the scan driving circuit is configured to output the gate scanning signal to the m rows of scan lines; wherein m is an integer greater than or equal to 4.

3. The driving substrate according to claim 1, wherein the outputting unit comprises a switch thin film transistor, the switch thin film transistor comprises a plurality of sub thin film transistors, and the plurality of sub thin film transistors are arranged in parallel and distributed in the pixel regions in at least two rows.

4. The driving substrate according to claim 3, wherein the plurality of sub thin film transistors comprise a first sub thin film transistor and a second sub thin film transistor, and the scan line connected to the drain of the first sub thin film transistor is different from the scan line connected to the drain of the second sub thin film transistor.

5. The driving substrate according to claim 3, wherein a single switch thin film transistor has a volume greater than a volume of a single thin film transistor in the charging unit and a volume of a single thin film transistor in the resetting unit.

6. The driving substrate according to claim 1, wherein the outputting unit comprises a switch thin film transistor, and the switch thin film transistor is connected to the plurality of rows of scan lines, such that the scan driving unit simultaneously outputs a plurality of rows of gate scanning signals.

7. The driving substrate according to claim 1, wherein the plurality of rows of scan lines are defined as a scan line in a $1^{st}$ row, a scan line in a $2^{nd}$ row, a scan line in a $3^{rd}$ row, a scan line in an $n^{th}$ row, a scan line in an $(n+1)^{th}$ row, a scan line in an $(n+2)^{th}$ row . . . , and a scan line in an $m^{th}$ row, wherein m is an integer greater than or equal to 4;

the drain of the second thin film transistors is connected to the scan line in the $n^{th}$ row and the scan line in the $(n+1)^{th}$ row, to simultaneously output an $n^{th}$-row gate scanning signal and an $(n+1)^{th}$-row gate scanning signal; the gate of the third thin film transistor and the gate of the fourth thin film transistor are connected to the scan line in the $(n+2)^{th}$ row;

wherein n is an integer greater than or equal to 1 and less than m.

8. The driving substrate according to claim 7, wherein the first thin film transistor is configured as the charging unit, the second thin film transistor is configured as the outputting unit, and the third thin film transistor and the fourth thin film transistor are cooperatively configured as the resetting unit.

9. The driving substrate according to claim 8, wherein the first thin film transistor, the third thin film transistor, and the fourth thin film transistor are all arranged in pixel regions which are located in a row between the scan line in the $(n-1)^{th}$ row and the scan line in the $n^{th}$ row, and a second thin film transistor is arranged in the pixel regions which are located in a row between the scan line in the $n^{th}$ row and a scan line in the $(n+1)^{th}$ row.

10. The driving substrate according to claim 8, wherein the third thin film transistor and the fourth thin film transistor are located in the pixel regions which are located in a same column, and the first thin film transistor, the second thin film transistor, and the third thin film transistor are located in the pixel regions located in different columns.

11. The driving substrate according to claim 1, further comprising:

a low-level signal line, configured to provide the low-level signal;

wherein the clock signal line is configured to provide the clock signal, extends along an extending direction of the plurality of data lines, and is spaced from the plurality of data lines and connected to the source of the second thin film transistor;

the low-level signal line extends along the extending direction of the plurality of data lines, and is spaced from the plurality of data lines and connected to the drain of the third thin film transistor and the drain of the fourth thin film transistor.

12. The driving substrate according to claim 1, wherein the scan driving units at a same stage are configured to output the gate scanning signal to the scan line corresponding to the pixel regions spaced at least one row away from the scan driving units at the same stage.

13. The driving substrate according to claim 1, wherein a single scan driving unit is configured to simultaneously output at least two rows of gate scanning signals.

14. The driving substrate according to claim 1, wherein the scan line in the same row is divided into multiple segments, and each segment is driven by one or two scan driving units.

15. A display panel, comprising:

a driving substrate, comprising:

a base, comprising a display region;

a plurality of rows of scan lines and a plurality of data lines, arranged on the base; wherein a plurality of pixel regions are defined by the plurality of rows of scan lines and the plurality of data lines crossing each other substantially longitudinally and horizontally, the plurality of pixel regions are located in the display region, and row directions of the plurality of pixel regions are substantially parallel to the scan lines; and a scan driving circuit, arranged in the display region of the base and comprising a plurality of scan driving units which are cascaded; and a plurality of light-emitting units, wherein each of the plurality of pixel regions is arranged with one of the plurality of light-emitting units;

wherein a same scan driving unit is arranged in pixel regions in at least two rows among the plurality of pixel regions and capable of outputting at least one row of gate scanning signal;

wherein the scan driving unit comprises a charging unit, a resetting unit, and an outputting unit connected to a clock signal line;

the outputting unit is located in the pixel regions in one or two rows, and the charging unit and the resetting unit are located in the pixel regions in another row different from the rows in which the pixel regions having the outputting unit is located; or the outputting unit is located in pixel regions in a first row, the charging unit is located in pixel regions in a second row, the resetting unit is located in pixel regions in a third row, and the first row, the second row, and the third row are different from each other;

the scan driving unit comprises a plurality of thin film transistors, and the plurality of thin film transistors are distributed in the pixel regions in two or three rows;

the scan driving unit comprises a first thin film transistor, a second thin film transistor, a third thin film transistor, a fourth thin film transistor, and a capacitor;

a source of the first thin film transistor is connected to a gate of the first thin film transistor and an output terminal of the gate scanning signal at a previous stage, and a drain of the first thin film transistor is connected to a source of the fourth thin film transistor and a gate of the second thin film transistor;

a source of the second thin film transistor is provided with a clock signal, and a drain of the second thin film transistor is connected to at least one row of the scan lines to output at least one row of the gate scanning signal;

a gate of the third thin film transistor and a gate of the fourth thin film transistor are connected to a first scan line, and a source of the third thin film transistor and the drain of the second thin film transistor are connected to a second scan line; a drain of the third thin film transistor and a drain of the fourth thin film transistor is provided with a low-level signal;

the capacitor is connected to the gate of the second thin film transistor and the drain of the second thin film transistor;

wherein the gate of the first thin film transistor is connected to a third scan line, and the first scan line, the second scan line, and the third scan line are different from each other.

16. The display panel according to claim 15, wherein the number of the rows of scan lines is m, m rows of scan lines are defined as a scan line in a $1^{st}$ row, a scan line in a $2^{nd}$ row, a scan line in a $3^{rd}$ row, . . . , and a scan line in an $m^{th}$ row;

the scan driving circuit is arranged in pixel regions defined by the scan lines in the $2^{nd}$ row to the $(m-1)^{th}$ row, and the scan driving circuit is configured to output the gate scanning signal to the m rows of scan lines; wherein m is an integer greater than or equal to 4.

17. A display panel, comprising:

a first substrate, comprising:

a base, comprising a display region;

a plurality of rows of scan lines and a plurality of data lines, arranged on the base; wherein a plurality of pixel regions are defined by the plurality of rows of scan lines and the plurality of data lines crossing each other substantially longitudinally and horizontally, the plurality of pixel regions are located in the display region, and row directions of the plurality of pixel regions are substantially parallel to the scan lines; and a scan driving circuit, arranged in the display region of the base and comprising a plurality of scan driving units which are cascaded; wherein a same scan driving unit is arranged in pixel regions in at least two rows among the plurality of pixel regions and capable of outputting at least one row of gate scanning signal;

a second substrate, facing towards the first substrate; and a light-emitting unit, disposed between the first substrate and the second substrate;

wherein the plurality of rows of scan lines and the plurality of data lines are arranged on a side of the base close to the second substrate;

wherein the scan driving unit comprises a charging unit, a resetting unit, and an outputting unit connected to a clock signal line;

the outputting unit is located in the pixel regions in one or two rows, and the charging unit and the resetting unit are located in the pixel regions in another row different from the rows in which the pixel regions having the outputting unit is located; or the outputting unit is located in pixel regions in a first row, the charging unit is located in pixel regions in a second row, the resetting unit is located in pixel regions in a third row, and the first row, the second row, and the third row are different from each other;

the scan driving unit comprises a plurality of thin film transistors, and the plurality of thin film transistors are distributed in the pixel regions in two or three rows;

the scan driving unit comprises a first thin film transistor, a second thin film transistor, a third thin film transistor, a fourth thin film transistor, and a capacitor;

a source of the first thin film transistor is connected to a gate of the first thin film transistor and an output terminal of the gate scanning signal at a previous stage, and a drain of the first thin film transistor is connected to a source of the fourth thin film transistor and a gate of the second thin film transistor;

a source of the second thin film transistor is provided with a clock signal, and a drain of the second thin film transistor is connected to at least one row of the scan lines to output at least one row of the gate scanning signal;

a gate of the third thin film transistor and a gate of the fourth thin film transistor are connected to a first scan line, and a source of the third thin film transistor and the drain of the second thin film transistor are connected to a second scan line; a drain of the third thin film transistor and a drain of the fourth thin film transistor is provided with a low-level signal;

the capacitor is connected to the gate of the second thin film transistor and the drain of the second thin film transistor;

wherein the gate of the first thin film transistor is connected to a third scan line, and the first scan line, the second scan line, and the third scan line are different from each other.

* * * * *